United States Patent

Sypula et al.

Patent Number: 5,571,463
Date of Patent: Nov. 5, 1996

[54] METHOD OF FABRICATING A MICROPOROUS SURFACE BLOTTER ROLL

[75] Inventors: Donald S. Sypula, Penfield; Santokh S. Badesha, Pittsford, both of N.Y.

[73] Assignee: Xerox Corporation, Stamford, Conn.

[21] Appl. No.: 599,207

[22] Filed: Feb. 9, 1996

[51] Int. Cl.$^6$ .................................................. B29C 67/20
[52] U.S. Cl. ........................ 264/45.9; 264/48; 264/49; 264/101; 264/510; 264/112; 264/238
[58] Field of Search .......................... 264/41, 45.9, 48, 264/49, 101, 510, 512, 112, 238

[56] References Cited

U.S. PATENT DOCUMENTS

| | | | |
|---|---|---|---|
| 3,696,180 | 10/1972 | Cunningham et al. | 264/48 |
| 3,729,536 | 4/1973 | Warwicker | 264/41 |
| 3,860,680 | 1/1975 | Warwicker et al. | 264/41 |
| 3,968,292 | 7/1976 | Pearman et al. | 428/213 |
| 4,157,424 | 6/1979 | Boutle | 521/61 |
| 4,195,570 | 4/1980 | Haren | 264/49 |
| 4,212,839 | 7/1980 | Funahashi | 264/49 |
| 4,226,911 | 10/1980 | Haren | 264/49 |
| 4,286,039 | 8/1981 | Landa et al. | 430/119 |
| 4,985,733 | 1/1991 | Kurotori et al. | 355/282 |
| 5,136,334 | 8/1992 | Camis et al. | 355/256 |
| 5,185,111 | 2/1993 | Lazar | 264/49 |
| 5,332,642 | 7/1994 | Simms et al. | 430/125 |
| 5,424,813 | 6/1995 | Schlueter, Jr. et al. | 355/256 |
| 5,481,341 | 1/1996 | Sypula et al. | 355/256 |

*Primary Examiner*—Allan R. Kuhns
*Attorney, Agent, or Firm*—Tallam I. Nguti

[57] ABSTRACT

A method of fabricating a controlled and uniform cell size blotter roll for blotting liquid images consisting of toner particles and carrier liquid. The method includes the step of mixing a first grade of salt having first particles of a first uniform size with a polymer material so as to form a first mixture. The method next includes a step of extruding the first mixture to form an extruded sleeve having intimately compacted polymer material and salt particles, an outer surface, and an inner surface defining a hollow interior. The method then includes curing the extruded sleeve until rigid and dry; abrading the outer surface and the inner surface of the extruded sleeve so as to remove any extrusion induced skin layer and to increase a number of open cells on each surface; applying an adhesive layer onto the abraded outer surface; forming a surface layer by coating the adhesive layer with powder particles of a second mixture consisting of a polymer material and a second grade of salt having second particles of a second, uniform size substantially less than the uniform size of the particles of the first grade of salt; leeching the particles of the first and the second grades of salt from the surface layer, and from the extruded sleeve, in order to form a conformable, compound open cell foam sleeve having controlled uniform cells and the desired hollow interior; and inserting into the desired hollow interior a rigid core having connections for connecting to a vacuum system.

6 Claims, 3 Drawing Sheets

METHOD OF FABRICATING A MICROPOROUS SURFACE BLOTTER ROLL

Background of the Invention

This invention relates to liquid electrophotographic reproduction machines, and more particularly to a method of making a microporous surface blotter roll for removing carrier liquid from toner dispersant used in such machines to form toner images.

A liquid electrostatographic reproduction machine employs an imaging member that is exposed to an image to be printed. Exposure of the imaging member records an electrostatic latent image on it corresponding to informational areas contained within the image to be printed.

The latent image is developed by bringing a developer material into contact therewith. The developed image recorded on the photoconductive member is conditioned and then transferred to a support substrate such as paper, either directly or via an intermediate transport member. The developed image on the support substrate is subsequently subjected to heat and/or pressure in order to permanently fuse it to the substrate.

Liquid developer typically contains about 2 percent by weight of fine solid particulate toner material that is dispersed in a carrier liquid, such as a hydrocarbon. The developed image on the imaging member or photoreceptor ordinarily contains about 12 weight percent of particulate toner material or particles in the hydrocarbon carrier liquid. Conditioning such an image therefore includes increasing the percent solids of the image by removing carrier liquid from the image while preventing the solid toner particles from leaving the image, and of electrostatically compressing or compacting the toner particles in order to physically stabilize the image, and produce a clear, high resolution image.

Such conditioning must however be achieved without disturbing the toner image, and in such a manner to prevent toner particles from entering the carrier liquid removal device. In addition, the carrier liquid removal device must also remain clean and free of toner particles so as to prevent it from thereafter contaminating a subsequent image with embedded toner particles.

Various techniques and devices including blotter rolls or rollers have been devised for conditioning the liquid developer image by removing carrier liquid from the image as discussed above. Such blotter rolls may include a vacuum removal system or an electrical bias applied thereto in order to assist the removal process. The following references may be relevant to various aspects of the present invention.

U.S. Pat. No. 4,286,039 issued Aug. 25, 1981, discloses an image forming apparatus comprising a deformable polyurethane roller, which may be a squeegee roller or blotting roller which is biased by a potential having a sign the same as the sign of the charged toner particles in a liquid developer. The bias on the polyurethane roller is such that it prevents streaking, smearing, tailing or distortion of the developed electrostatic image and removes much of the carrier liquid of the liquid developer from the surface of the photoconductor.

U.S. Pat. No. 4,985,733 issued Jan. 15, 1991, to Kurotori et. al. discloses a liquid toner copying machine including a non-thermal image conditioning apparatus comprising an elastic blotter roll and an elastic backup roller for bringing a liquid toner image carrying sheet into contact with the blotter roll.

U.S. Pat. No. 5,136,334 issued Aug. 4, 1992, to Camis et. al. discloses a liquid toner image conditioning apparatus including a heated inner core connected to a source of AC or DC bias, and having a smooth outer surface made of a soft elastomeric material.

U.S. Pat. No. 5,332,642, issued Jul. 26, 1994, having a common assignee as the present application, discloses a porous roller for increasing the solids content of an image formed from a liquid developer. The liquid dispersant absorbed through the roller is vacuumed out through a central cavity of the roller. The roller core and/or the absorbent material formed around the core may be biased with the same charge as the toner so that the toner is repelled from the roller while the dispersant is absorbed.

U.S. Pat. No. 5,424,813, issued Jun. 13, 1995, to Schlueter et. al., and having a common assignee as the present application discloses a roller comprising an absorption material and a covering, which are adapted to absorb carrier liquid from a liquid developer image. The covering has a smooth surface with a plurality of perforations, to permit carrier liquid to pass through to the absorption material at an increased rate, while maintaining a covering having a smooth surface which is substantially impervious to toner particles yet pervious to carrier liquid so as to inhibit toner particles from departing the image.

Although some of the above example references suggest or disclose particular structures for a blotter roll, it has been found that much difficulty is encountered in fabricating a blotter roll that has a microporous surface, controlled, uniform size open cells, and an efficient liquid transport interface between the microporous surface layer and an underlying absorbent larger cell open cell layer.

SUMMARY OF THE INVENTION

In accordance with one embodiment of the present invention, there is provided a method of fabricating a controlled and uniform cell size blotter roll for blotting liquid images consisting of toner particles and carrier liquid. The method includes the step of mixing a first grade of salt having first particles of a first uniform size with a polymer material so as to form a first mixture. The method next includes a step of extruding the first mixture to form a single sleeve having intimately compacted polymer material and salt particles, an outer surface, and an inner surface defining a hollow interior. The method then includes curing the extruded sleeve until rigid; mixing a second grade of salt having second particles of a second uniform microsize, and a polymer material to form a second mixture; co-extruding the second mixture directly onto the extruded sleeve to form a solid compound polymer and salt particles sleeve; curing the compound sleeve by drying; leeching salt particles from the dried solid compound sleeve to form a conformable open cell sleeve having open cells and a hollow interior; and finally inserting into the hollow interior a rigid core for supporting the conformable compound sleeve.

Pursuant to another embodiment of the present invention, there is provided a method of fabricating a controlled and uniform cell size blotter roll for blotting liquid images consisting of toner particles and carrier liquid. The method includes the step of mixing a first grade of salt having first particles of a first uniform size with a polymer material so as to form a first mixture. The method next includes a step of extruding the first mixture to form an extruded sleeve having intimately compacted polymer material and salt particles, an outer surface, and an inner surface defining a hollow interior. The method then includes curing the extruded sleeve until rigid and dry; abrading the outer surface and the inner surface of the extruded sleeve so as to remove any extrusion induced skin layer and to increase a number of open cells on each surface; applying an adhesive layer onto the abraded outer surface; forming a surface layer by coating the adhesive layer with powder particles of a second mixture consisting of a polymer material and a second grade of salt having second particles of a second, uniform size substantially less than the uniform size of the first particles of the first grade of salt; leaching the particles of the first and the second grades of salt from the surface layer and from the extruded sleeve in order to form a conformable, compound open cell foam sleeve having controlled uniform cells and the desired hollow interior; and inserting into the desired hollow interior a rigid core having connections for connecting to a vacuum system.

DETAILED DESCRIPTION OF THE INVENTION

Figure 1:
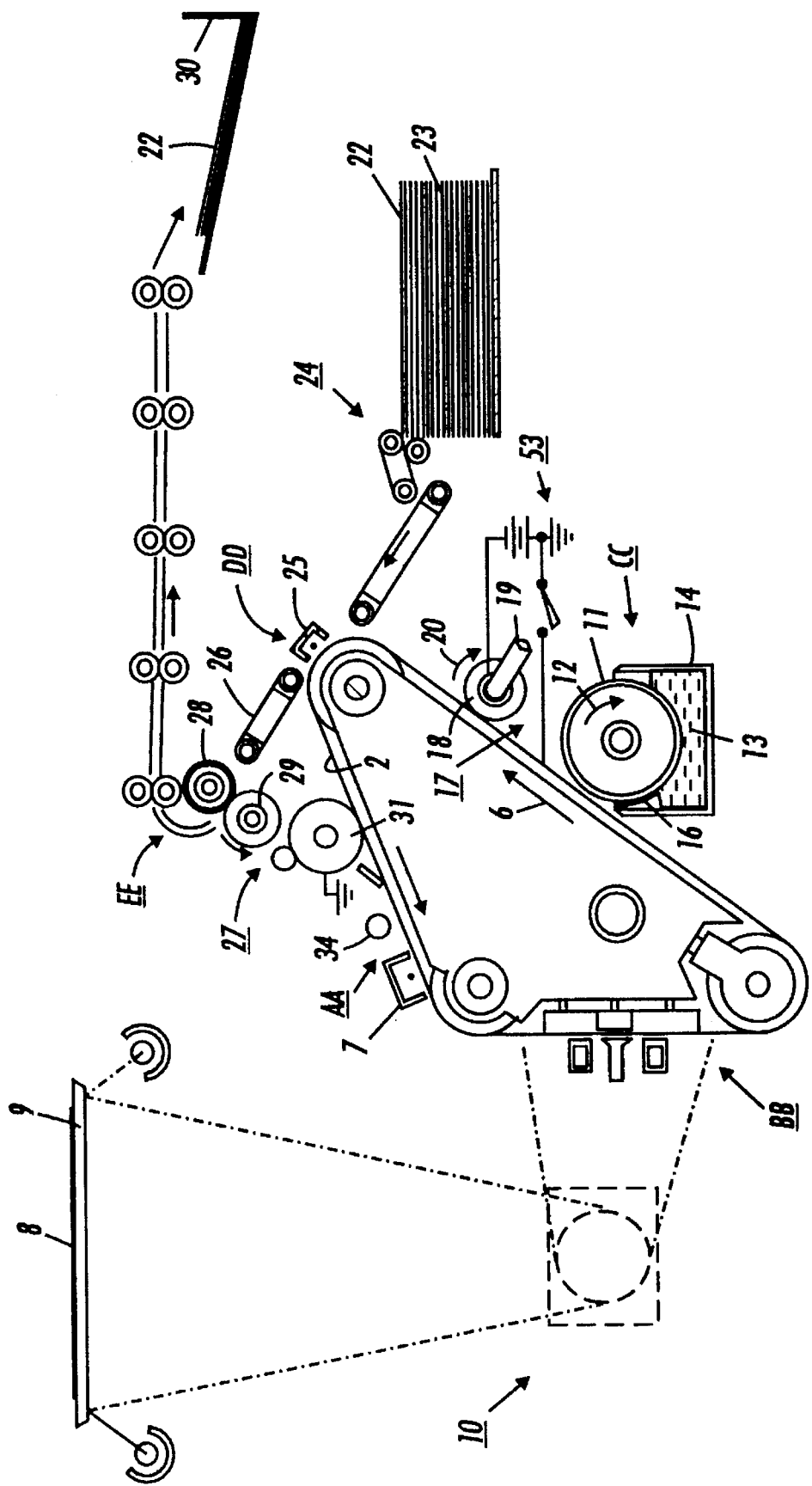
FIG. 1 is a schematic elevational view depicting an electrophotographic reproduction machine incorporating a blotter roll fabricated in accordance with the present invention.

In FIG. 1, reproduction machine 1 employs belt 2 having a photoconductive surface deposited on a conductive substrate. Initially, belt 2 passes through charging station AA. At charging station AA, a corona generating device 7 charges the photoconductive surface of belt 2 to a relatively high, substantially uniform potential.

After the photoconductive surface of belt 2 is charged, the charged portion is advanced to exposure station BB. At exposure station BB, an original document 8 is placed upon a transparent support platen 9. An illumination assembly, indicated generally by the reference numeral 10, illuminates the original document 8 on platen 9 to produce image rays corresponding to the document information areas. The image rays are projected by means of an optical system onto the charged portion of the photoconductive surface. The light image dissipates the charge in selected areas to record an electrostatic latent image on the photoconductive surface corresponding to the original document informational areas.

After the electrostatic latent image has been recorded, belt 2 advances the electrostatic latent image to development station CC. At development station CC, roller 11, rotating in the direction of arrow 12, advances a liquid developer material 13 from the chamber of housing 14 to development zone 17. An electrode 16 positioned before the entrance to development zone 17 is electrically biased to generate an AC field just prior to the entrance to development zone 17 so as to disperse the toner particles substantially uniformly throughout the carrier liquid. The toner particles, disseminated through the carrier liquid, pass by electrophoresis to the electrostatic latent image. The charge of the toner particles is opposite in polarity to the charge on the photoconductive surface.

By way of example, the insulating carrier liquid may be a hydrocarbon liquid although other insulating liquids may also be employed. A suitable hydrocarbon liquid is ISOPAR which is a trademark of the Exxon Corporation. There is an increased tendency to use carrier liquids such as mineral oil whose structural properties are less volatile, and thereby emit a lower amount of vapor into the atmosphere, consequently emitting fewer harmful and offensive odors. The toner particles comprise a binder and a pigment. However, one skilled in the art will appreciate that any suitable liquid development material may be employed.

Development station CC includes porous image conditioning roller 18 of the present invention. Roller 18 encounters the developed image on belt 2 and conditions the image by removing and reducing liquid content of the image, while inhibiting and preventing the solid toner particles from leaving the image. The roller 18 also conditions the image by electrostatically compacting the toner particles of the image. Thus, an increase in percent solids is achieved in the developed image, thereby improving the quality of the final image.

U.S. Pat. No. 5,481,341 issued Jan. 2, 1996, and having a common assignee as the present application, (and incorporated herein by reference) discloses an example of a roller for removal of excess carrier liquid from a liquid developed image, comprising a rigid porous electroconductive supportive core, a conformable microporous resistive foam material provided around the core, and a pressure controller for providing a positive or negative pressure to the roller. The structure and particularly a method of fabricating (in accordance with the method of the present invention) a porous roller 18 will be described below with reference to FIGS. 3 and 4.

Porous roller 18 as shown, operates in conjunction with a vacuum system 19 which removes liquid from the roller. A roller (not shown), in pressure contact against the blotter roller, may be used in conjunction with or in the place of the vacuum system 19, to squeeze the absorbed carrier liquid from the blotter roller for deposit into a receptacle. An electrical potential is applied to roller 18 from a high voltage bias supply 53. The electric field, having the same sign polarity as the toner particles, repels the toner particles of the image and inhibits their entry to the roller 18.

In operation, roller 18 rotates in direction 20 to encounter a "wet" image on belt 2. The porous body of roller 18 absorbs excess liquid from the surface of the image through the porous skin covering, while conditioning the image on belt 2. Vacuum system 19 located on one end of the central cavity of the roller, draws liquid that has permeated through roller 18 out through the cavity and deposits the liquid in a receptacle or some other location which will allow for either disposal or recirculation of the carrier liquid. Porous roller 18, discharged of excess liquid, continues to rotate in direction 20 to provide a continuous absorption of liquid from the image on belt 2.

After the electrostatic latent image is developed, belt 2 advances the developed image to transfer station DD. At transfer station DD, a sheet of support material 22 is advanced from stack 23 by a sheet transport mechanism, indicated generally by the reference numeral 24. Transfer station DD includes a corona generating device 25 which sprays ions onto the backside of the sheet of support material 22. This attracts the developed image from the photoconductive surface of belt 2 to copy sheet 22. After transfer, conveyor belt 26 moves the copy sheet 22 to fusing station EE.

Fusing station EE includes a fuser assembly indicated generally by the reference numeral 27, which permanently fuses the developed image to the copy sheet 22. Fuser assembly 27 includes a heated fuser roll 28 and back-up pressure roll 29 resiliently urged into engagement with one another to form a nip through which the copy sheet 22 passes. After fusing, the finished copy sheet 22 is discharged to output tray 30 for removal by the machine operator.

After the developed image is transferred to copy sheet 22, residual liquid developer material remains adhering to the photoconductive surface of belt 2. A cleaning roller 31 formed of any appropriate synthetic resin, is driven in a direction opposite to the direction of movement of belt 2 to scrub the photoconductive surface clean. It is understood, however, that a number of photoconductor cleaning means exist in the art, any of which would be suitable for use with the present invention. Any residual charge left on the photoconductive surface is extinguished by flooding the photoconductive surface with light from lamps 34.

Figure 2:
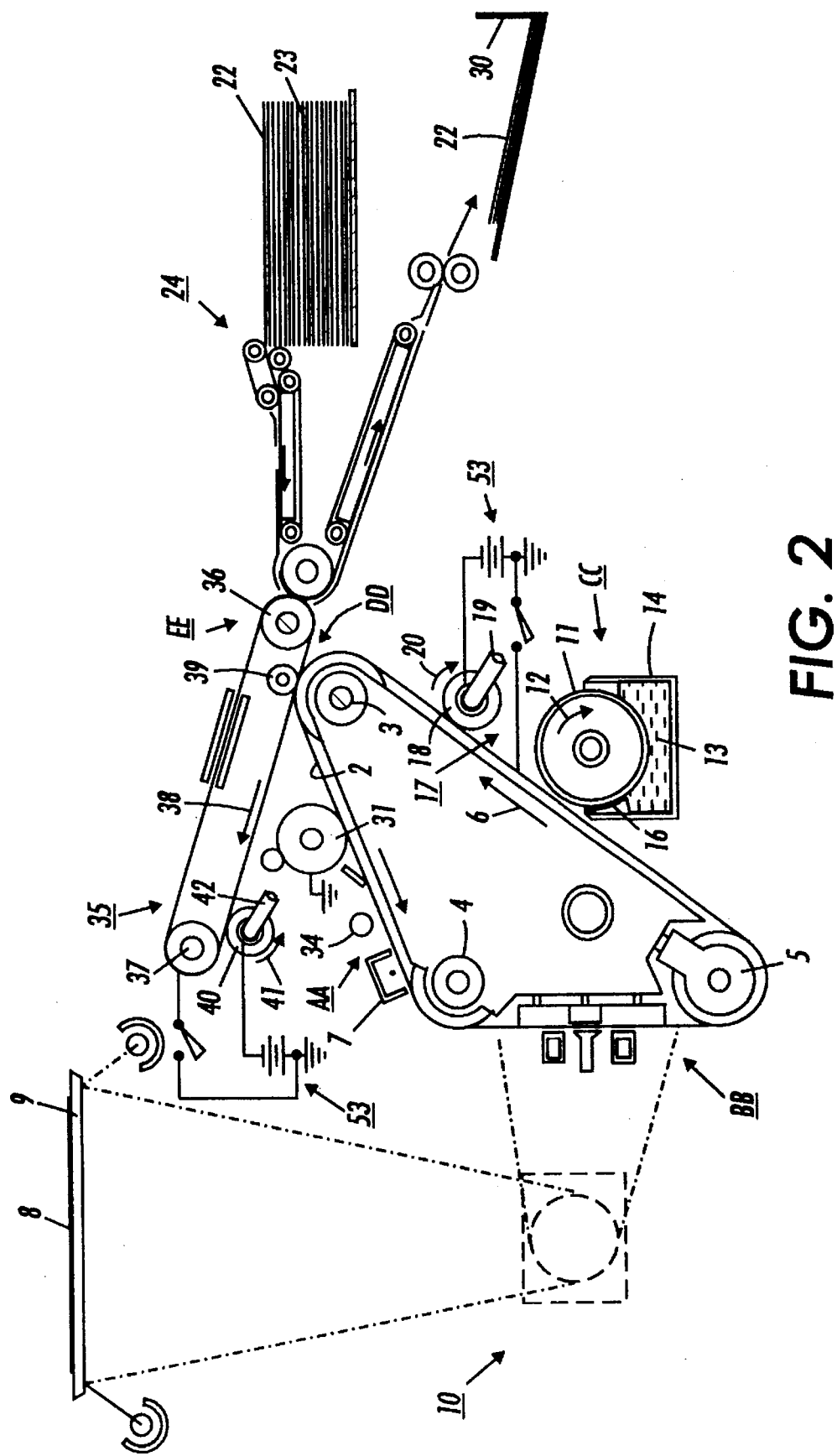
FIG. 2 is a schematic elevational view depicting a portion of another electrophotographic reproduction machine using an intermediate transfer belt and incorporating the blotter roll of FIG. 1.

FIG. 2 is a schematic representation of a portion of another reproduction machine which employs a moving image carrying belt, from which an image is transferred to an intermediate belt 35. In FIG. 2, elements that are identical to elements in FIG. 1 are identified with like reference numerals. Referring to FIG. 2, after the electrostatic latent image is developed and conditioned with a roller 18, belt 2 advances the developed image to transfer station DD. At transfer station DD, the developed liquid image is electrostatically transferred to an intermediate member or belt indicated generally by the reference numeral 35. Intermediate belt 35 is entrained about spaced rollers 36 and 37. Intermediate belt 35 moves in the direction of arrow 38. Bias transfer roller 39 imposes intermediate belt 35 against belt 2 to assure image transfer to the intermediate belt 35. In this particular embodiment of the machine, an additional conditioning roller shown as porous blotter roller 40, conditions the developed image on belt 35 by electrostatically compressing the image, and additionally reducing the liquid content of the image, while preventing toner particles from departing from the image. The blotter roller 40 is also fabricated in accordance with the method of the present invention (to be described below). The roller 40 increases percent solids of the image to about 25 to 75 weight by removing additional excess carrier liquid therefrom. Increasing solids on the intermediate belt is a particularly important function in a color image developing process utilizing multiple superimposed images of different colors.

In operation, roller 40 rotates in direction 41 to impose against the image on belt 35. The porous body of roller 40 absorbs liquid from the surface of the image. The absorbed liquid permeates through roller 40 and into the inner hollow cavity, where a vacuum system 42 draws the liquid from the roller 40 into a liquid receptacle (not shown) or some other location which will allow for either disposal or recirculation of the carrier liquid. Porous roller 40, discharged of excess liquid, continues to rotate in direction 41 to provide a continuous absorption of liquid from images on transfer belt 35.

Belt 35 then advances the developed image to transfer/fusing station E'E'. At transfer/fusing station E'E', a sheet of support material 22 is advanced from stack 23 by a sheet transport mechanism, indicated generally by the reference numeral 24. The developed image from the photoconductive surface of belt 35 is attracted to copy sheet 22 due to the bias applied by biased roller 56, and is simultaneously heated and fused to the sheet by heat from roller 36, for example. After transfer, conveyor belt 45 moves the copy sheet 22 to the discharge output tray 30.

Although the apparatus shown in FIG. 2 shows only a single porous roller 40, multiple porous roller stations can be utilized in conjunction with a single belt or with the transfer of multiple images to an intermediate belt 35.

Figure 3:
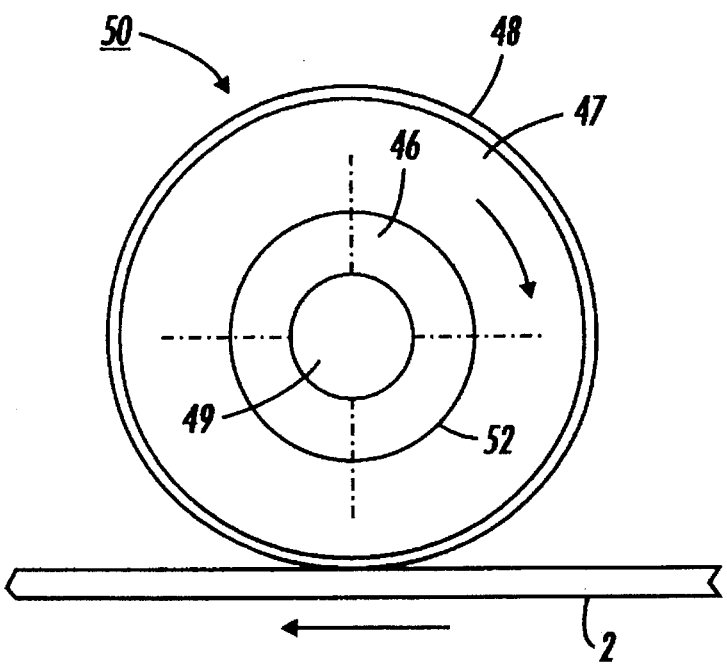
FIG. 3 is an enlarged schematic, end view of the blotter roll of FIG. 1 and FIG. 2.
Figure 4:
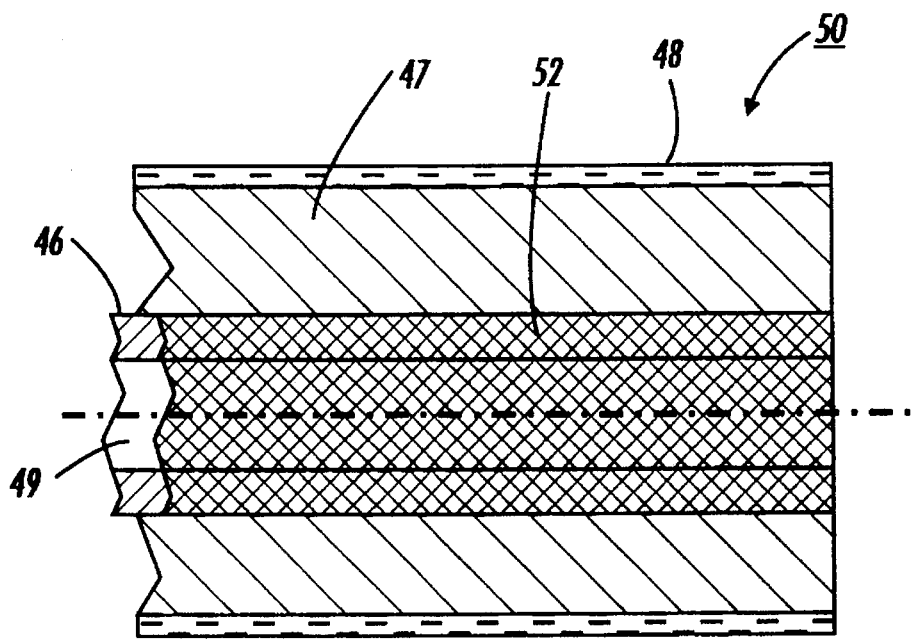
FIG. 4 is an enlarged schematic, sectional longitudinal view of the blotter roll of FIG. 1 and FIG. 2.

Referring now to FIGS. 3 and 4, there is shown detailed structures of different embodiments of the porous blotter roller 18 of development station CC of FIGS. 1 and 2, as well as, of the porous blotter roller 40 of intermediate belt 35 of FIG. 2. These rollers 18, 40, with reference to FIGS. 3 and 4, will be collectively referred to below by the single reference numeral 50. Thus, identical elements associated with rollers 18, 40 will be identified with like reference numerals in blotter roller 50.

With reference to FIGS. 3 and 4, blotter roller 50 comprises a rigid, porous support core 46 having perforations or pores. The porous supportive core 46 can be made from a sintered metal, plastic, ceramic or other material, which alone or in combination has the requisite rigidity and porosity for conditioning the liquid developer image. Exemplary metals include stainless steel, copper and bronze. Preferably, the material is electroconductive, either by itself, or in combination with another conductive material, so that the bias 53 can be applied thereto. Where the core 46 is non-conductive, the bias 53 is applied to a conductive wire mesh layer 52 that forms a coaxial electrode around the core 46. By way of example, the pores of the core 46 generally may be of a diameter of 2,500 microns or less. The wire mesh layer 52, operates to reduce the electrical requirements of the materials that make up the core 46. When the thin layer of wire mesh 52 is used, it is formed as shown so as to completely surround an inner layer surface of a foam material sleeve 47. This ensures a uniform electric field across the length of the roller. The electric field generated by bias supply 53 is of the same polarity as that of the toner particles, so that the toner particles are electrostatically repelled from the blotter roller 50. In this embodiment, the core 46 is in the form of a tube, having a wall with perforations therethrough, and a hollow cavity or interior 49 throughout the length of the roller. The blotter roll 50 is fabricated in accordance with the method of the present invention so that it has a microporous surface, controlled, uniform size open cells, and an efficient liquid transport interface between the microporous surface layer and an underlying absorbent larger cell open cell layer.

As shown, the roller 50 includes the conformable porous open cell foam material sleeve 47 formed over the core 46 or over wire mesh 52, and a microporous skin covering or surface layer 48 formed over the foam material sleeve 47. The vacuum system 19 (FIGS. 1 and 2) is ordinarily connected to an end of the core 46 and draws carrier liquid (that has permeated through the various layers 47, 48) into and through the cavity 49.

The open cell foam material sleeve 47 may be comprised of an electrically resistive, absorbent polymeric and elastomeric foam material incorporating conductive filler or dissipative filler. The conformable foam material sleeve 47 is characterized by a durometer of from 10 to 90. Shore A, preferably from 20 to 60 Shore A, and has a thickness of about 40 mils to 250 mils. Preferably the foam material sleeve 47 is resistive so that the electric field created by the bias 53 and applied to the core 46 to the wire mesh layer 52, is uniformly distributed along the surface of the blotter roller 50. A suitable level of resistivity of the absorbent material is in the range of $10^5$ to $10^{11}$ ohm-cm, and is preferably in the range of $10^6$ to $10_9$ ohm-cm in order to prevent leakage of the bias field.

The open cell pores of the foam material sleeve 47 generally may be less than 1,000 microns in diameter, and preferably should be in the range of about 5 to about 300 microns, although the end product may use pore sizes outside these limits. For example, very small pores of a micron or less, may be used to absorb carrier liquid from an image, however, an undesirably increased pressure or vacuum would then be required to extract an equivalent amount of liquid as that of a roller having larger size pores.

When fabricated in accordance with the methods of the present invention, the surface layer or skin covering 48 has a smooth, glossy surface texture with micropores which are generally of a smaller size than the size of toner particles of the liquid developer. A minimal surface area texture of the skin covering 48 is preferred so that toner particles are not encouraged to leave the developed image and to embed into larger sized pores and/or the irregularities of a rougher skin surface having a greater surface area texture. The covering 48 should be of a texture and a capillary wetting level so that it is substantially impervious to toner particles, yet pervious to carrier liquid, in order to inhibit toner particles from departing the image.

In accordance with the method of the present invention, the open cell resistive foam material sleeve 47 is formed initially by extrusion and has a relatively large pore size for adequate flow of the hydrocarbon carrier liquid. For the extrusion, a first composition or mixture of a polymer such as a polyurethane material is made by mixing it with carbon material for controlled resistivity, and with a first grade of salt (e.g. sodium nitrate) that has particles of a first desirable, uniform size equal to the size of each desired cell of the foam material sleeve. The desired cell size in the foam material sleeve is about 60 to 100 microns and the wall thickness is to be about 0.125 inches. The first composition or mixture is then extruded, thus intimately compacting adjacent salt particles in the polymer to form the sleeve 47. Compacting the salt particles as such, advantageously results in more connectedly open cells upon removal of the particles as described below. Ordinarily, a film or skin layer is formed on the interior and exterior surfaces of such an extruded sleeve during the extrusion process.

The open cell foam material sleeve or layer 47 preferably is fabricated so that it has adequate cell size, as well as foam material thickness and durometer in order to give the required performance in the blotting application. The extrusion skin layer (formed during the extrusion of the foam material sleeve 47) is removed from the inside and outside surface of the foam material sleeve by using an abrasive device to abrade and remove such skin. For example, the interior and exterior surfaces of the sleeve 47 when cured and dried, are made more liquid and vacuum pressure efficient (in the finished roller 50) by grinding or abrading so as to create more open cells on these surfaces. Such abrading can be achieved as above by the use of an abrasive paper such as Tufbak Durite T421 400-A 152 from Norton Inc. The abrading step can be done for example by rotating the dried open cell foam material sleeve 47 (supported on the porous core 46 by means of end journals), and then contacting the abrasive paper or material to the surface of the foam material sleeve 47. The contact should be continued until the surface of the foam material sleeve is free of skin or film layer, and exhibits uniformly open cells and pores with no significant closures of the cells. The sleeve 47 is made as such so that it has a controlled, uniform cell size, controlled dimensions, and a durometer that are suitable for a LID ink image blotting application.

A first embodiment of the method of the present invention next includes applying an adhesive material layer 60 onto the outside abraded surface of the foam material sleeve 47. The adhesive should be applied such that it does not significantly close pores in the surface of the sleeve 47. The adhesive is applied onto the abraded surface of the open cell foam material sleeve 47, for example, by spraying. During such spraying, the porous core 46, and foam material sleeve 47, can be pressurized with air in order to prevent the adhesive from filling or clogging up any cells or pores of the foam material sleeve. The adhesive could be a room temperature curable type material such as an epoxy dispersed in a solvent and which dries and hardens with the evaporation of the solvent. The solvent can be organic or water. On the other hand, the adhesive can be a thermal set type which chemically cures at an elevated temperature. The solvent used should be volatile so that it almost completely or completely evaporates before contact between the adhesive and the open cell foam material sleeve 47. As such, significant solvent absorption by the foam material sleeve is prevented. The thickness of the adhesive layer 60 should be relatively small, and on the order of fractions of the thickness of the wall of the foam material sleeve 47.

The first embodiment of the method of the present invention further includes forming the very fine cell size foam particulate material layer 48 onto the adhesive layer 60. The micro-porous surface layer 48 allows hydrocarbon carrier liquid to pass into the open cell foam material sleeve 47, as well as further provides a capillary seal for the hydrocarbon liquid against toner particles (2 to 12 micron in size) that would otherwise pass into the open cell foam material sleeve 47. In other words, the microporous surface layer 48 is formed over the absorbent layer 47 for providing capillary sealing, and for preventing the penetration of the toner particles from the LID ink image into the interior pores of the foam material sleeve 47. The very fine small cell size is preferably about 4 microns on an average.

The micro-porous surface layer 48 as made in accordance with the method of the present invention, has a thickness of about 0.5 to 4 mils. It is formed by applying a powder of a second, very fine, open cell foam material composition onto the adhesive layer 60. This second foam material composition can also contain carbon or other additives for controlling the resistivity of the layer 48. Importantly, this second foam material composition is prepared for example from a resistive foam material (available under a tradename PERMAIR from Porvair Inc. Ltd of England.) supplied in the form of sheets. The PERMAIR material is microporous and has a desired very fine cell size for use on the surface of the blotter roll 50. To form the powder, a sheet of this resistive foam material is cryogenically ground into fine foam powder particles.

In further accordance with the present invention, a very fine cell foam material that is equivalent to PERMAIR can be prepared by forming the second composition using thermoplastic polyurethane material and a second grade of salt, such as of sodium nitrate, that has micro particles. The micro particles should be substantially less in size than the particles of the first grade of salt, and are equal in size to a desired cell size of the microporous surface layer 48. After curing and drying the second composition into a desired shape or form, such as into a sheet form, it is also cryogenically ground into fine foam powder particles that have relatively very fine open cells and thus are porous to liquids, but practically impervious to solids.

In accordance with the first embodiment of the present invention, the ground, powdered particulate material is next applied onto the adhesive layer 60 by any suitable powder coating technique, such as by rolling the adhesive covered surface of the sleeve 47 in the powder material. A negative air pressure can be applied through the core of the blotter roll, and such that it acts to draw the powder particulate foam material into the larger open cells on the surface of the foam material sleeve 47, and so as to improve contact with the adhesive. The adhesive layer 60, and an initial powdered foam particulate material layer 48 that is formed thus, can be re-applied in order to build-up the thickness of the final microporous surface layer 48.

The elastomeric polyurethane surface layer 48 is then cured and dried at room temperature or at an elevated temperature that does not degrade the polyurethane. After such drying, salt particles from the surface layer 48, and from the sleeve 47 of the completed compound sleeve are removed by dissolving for example with water. Other methods of forming the very fine porous powder foam particulate material for the surface layer 48 are contemplated by the scope of this invention, and include for example, chemical foaming, followed by spray drying to remove any volatile solvent prior to curing and grinding.

Alternatively, in accordance to a second embodiment of the method of the present invention, instead of applying a layer 60 of adhesive onto the outer surface of the sleeve 47, and then powder coating the adhesive with a ground powder of the second composition, the second composition (i.e a mixture of polyurethane and the second, micro-particle size grade of salt) is co-extruded as a co-extruded layer 48 directly over a cured, rigid (but not dry) sleeve 47.

In short, the second elastomeric polyurethane material mixture used to form the surface layer 48 over the extruded sleeve 47, is preferably a room or low temperature curing polyurethane material that is essentially the same as that forming the sleeve 47, except for the size of the salt particles used to create its cells, e.g. 4 micron particle size salt. The room or low temperature curing polyurethane materials can be those from IPI Polyurethane Chemical Systems of Ekton Md. Furthermore, the elastomeric material used to form the microporous open cell foam surface layer can contain carbon or other additive for electrical resistivity control. The application of the microporous forming surface layer 48 over the extruded sleeve 47 is carried out after the sleeve 47 containing the first grade of salt with relatively larger particles has cured and become rigid, but before it dries.

After curing and drying the compound or composite co-extruded layers 47, 48 of the blotter roll 50, the salt particles used in the formation of each layer, are then removed, for example, by dissolution or leaching, or by jetting and other attrition method. The resulting roller thus has a microporous surface layer 48 for enabling capillary sealing of the surface, and the porous inner sleeve 47 having relatively larger cells for ease of flow of the liquid to the support core.

The foam material use in the layers 47, 48 is to be chemically resistant to a hydrocarbon carrier liquid which is used in the formulation of the LID ink image. The desirable properties of the foam are a thin and small cell size porous surface layer on the outside surface and a relatively larger open cell structure underneath with no extrusion skin layer (because removed by abrading) at the interface between the foam covering material and the porous core. This would provide relatively better separation of the hydrocarbon carrier liquid from the particulate toner material at the surface of the roll, and thus allow the liquid to pass easily through the porous foam material and into the porous core since there is no skin layer at the interface with the porous core.

The advantages of the above method steps for fabrication of the low solids image conditioning blotter roller 50 include the fact that it uses existing open cell foam or foam forming materials, and it enables the formation of controlled, uniform size open cells in each of the layers 47, 48. The pore size and accompanying material resistivity are not otherwise easily obtainable since the technology for preparing it is complicated. In addition, the fabrication method is relatively extruded and low cost to implement.

While the invention has been described with reference to particular preferred embodiments, the invention is not limited to the specific examples shown, and other embodiments and modifications can be made by those skilled in the art without departing from the spirit and scope of the invention and claims.

What is claimed is:

1. A method of fabricating a controlled and uniform cell size blotter roll for blotting liquid images consisting of toner particles and carrier liquid, the method comprising:

(a) first mixing a first grade of salt having particles of a first uniform size, and polymer material to form a first mixture;

(b) extruding the first mixture to form an extruded inner sleeve having intimately compacted polymer material and salt particles, an outer surface, and an inner surface defining a hollow interior;

(c) curing the extruded sleeve until rigid;

(d) next mixing a second grade of salt having particles of a second uniform microsize, and a polymer material to form a second mixture;

(e) co-extruding the second mixture as a surface layer directly onto the extruded inner sleeve to form a solid compound polymer and salt particles sleeve;

(f) curing the compound sleeve by drying;

(g) leaching all salt particles from the surface layer and from the inner sleeve in order to form a compound, conformable open cell sleeve having open cells and a hollow interior; and (h) inserting into the hollow interior a rigid support core.

2. The method of claim 1, wherein said step of first mixing to form a first mixture comprises mixing a first grade of sodium nitrate salt with polyurethane material in a desired extrudable ratio.

3. A method of fabricating a controlled and uniform cell size blotter roll for blotting liquid images consisting of toner particles and carrier liquid, the method comprising the steps of:

(a) first mixing a first grade of salt having first particles of a first uniform size with a polymer material to form a first mixture;

(b) extruding the first mixture to form an extruded inner sleeve having intimately compacted polymer material and salt particles, an outer surface, and an inner surface defining a hollow interior;

(c) curing the extruded sleeve until dry;

(d) abrading the outer surface and the inner surface of the extruded inner sleeve so as to remove any extrusion-induced skin layer thereon, and so as to increase a number of open cells on each these surfaces;

(e) applying an adhesive layer onto the abraded outer surface;

(f) next forming a surface layer onto the adhesive layer by coating the adhesive layer with micro-size powder particles of a second mixture consisting of a polymer material and a second grade of salt having particles of a second uniform size substantially less than the uniform size of the particles of the first grade of salt;

(g) curing the surface layer until dry;

(h) leaching with water all particles of the first and the second grades of salt from the surface layer and from the inner sleeve so as to form a conformable compound, open cell foam sleeve having controlled, uniform cells and the desired hollow interior; and (i) inserting into the desired hollow interior a rigid core having a vacuum system connection.

4. The method of claim 3, wherein said step of applying an adhesive layer includes attaching a source of positive air pressure to the hollow interior of the extruded inner sleeve so as to prevent the adhesive from entering and clogging open cells through the extruded sleeve.

5. The method of claim 3, wherein said step of next forming a surface layer includes previously cryogenically grinding a dried piece of the second mixture into the micro-size powder particles.

6. The method of claim 3, wherein said step of next forming a surface layer includes attaching a source of negative air pressure to the hollow interior of the extruded inner sleeve so as to draw the powder particles into relatively greater contact with the adhesive layer.

* * * * *